(12) United States Patent
Clegg

(10) Patent No.: US 8,099,115 B2
(45) Date of Patent: Jan. 17, 2012

(54) TCP OVER SMS

(75) Inventor: David L. Clegg, Altadena, CA (US)

(73) Assignee: Sybase, Inc., Dublin, CA (US)

( * ) Notice: Subject to any disclaimer, the term of this patent is extended or adjusted under 35 U.S.C. 154(b) by 1010 days.

(21) Appl. No.: 11/638,409

(22) Filed: Dec. 14, 2006

(65) Prior Publication Data

US 2008/0146257 A1 Jun. 19, 2008

(51) Int. Cl.
*H04W 4/00* (2009.01)
*H04L 29/08* (2006.01)

(52) U.S. Cl. .................. 455/466; 455/432.2; 455/414.4

(58) Field of Classification Search ............... 455/414.4, 455/432.2, 466
See application file for complete search history.

(56) References Cited

U.S. PATENT DOCUMENTS

| | | | |
|---|---|---|---|
| 6,665,711 B1 | 12/2003 | Boyle et al. | |
| 6,760,343 B1 | 7/2004 | Krishnamurthy et al. | |
| 6,785,259 B2 | 8/2004 | Le et al. | |
| 6,917,915 B2* | 7/2005 | Du et al. | 704/228 |
| 7,113,803 B2 | 9/2006 | Dehlin | |
| 7,623,526 B2* | 11/2009 | Rangel et al. | 370/395.5 |
| 2003/0046418 A1* | 3/2003 | Raval et al. | 709/237 |
| 2004/0039782 A1 | 2/2004 | Reddy et al. | |
| 2004/0085927 A1* | 5/2004 | Yannay et al. | 370/329 |
| 2004/0192312 A1* | 9/2004 | Li et al. | 455/445 |
| 2004/0203642 A1* | 10/2004 | Zatloukal et al. | 455/414.1 |
| 2006/0023520 A1* | 2/2006 | Mori et al. | 365/189.09 |
| 2008/0082678 A1* | 4/2008 | Lorch et al. | 709/230 |

FOREIGN PATENT DOCUMENTS

| | | |
|---|---|---|
| EP | 1 463 265 A2 | 9/2004 |
| FR | 2 778 297 A1 | 11/1999 |
| WO | WO 03/103198 A1 | 12/2003 |
| WO | WO 2008/016722 A2 | 2/2008 |

OTHER PUBLICATIONS

Websim: The WebSIM—Clever Smartcards Listen to Port 80 Scott Guthery Joachim Posegga Dec. 15, 1999 19:21.*
International Preliminary Report on Patentability for PCT application No. PCT/US2007/025470, issued Jun. 16, 2009, 7 pgs.
Search Report and Written Opinion for International Application No. PCT/US07/25470 mailed May 5, 2008, 7 pgs.
Written Opinion and Search Report, mailed Oct. 5, 2010, for Singapore Patent Appl. No. 200904034-6, 15 pages.
Guthery, S., et al., "The WebSIM—Clever Smartcards Listen to Port 80," Internet Citation, Retrieved from the Internet Dec. 15, 1999: URL:http://citeseer.ist.psu.edu/cache/papers/cs/15868/http:zSzzSzzSzwww.scdk.comzSzwebsim.pdf/guthery99websim.pdf, 16 pages.
Supplementary European Search Report issued in European Patent Application No. 07862839.3, European Patent Office, The Hague, Netherlands, mailed on Dec. 10, 2010.

* cited by examiner

*Primary Examiner* — Erika Gary
*Assistant Examiner* — Michael Mapa
(74) *Attorney, Agent, or Firm* — Sterne, Kessler, Goldstein & Fox PLLC

(57) ABSTRACT

A system, method, and computer program product for forming and transmitting a TCP/SMS message are presented. Steps for forming a TCP message, encoding the TCP message, and wrapping the TCP message in an SMS message are disclosed.

24 Claims, 6 Drawing Sheets

TCP OVER SMS

BACKGROUND OF INVENTION

1. Field of the Invention

The present invention relates generally to data communications and, more particularly, to data communications using Short Message Service (SMS) transport.

2. Description of the Background Art

Short Message Service (SMS) transport is a service commonly available on mobile devices for the purpose of sending short messages between such mobile devices. This service is commonly called "text messaging." Typically, the messages comprise a few characters of text, the precise number depending on a particular encoding scheme used by the SMS implementation.

Message delivery in the SMS standard is characterized as a "best effort" scheme. As a recipient of an SMS message will not necessarily have the receiving mobile device turned on or connected to a service network, it is not possible to guarantee delivery of the SMS message to the recipient. An SMS implementation will typically retry delivery to a receiving device in accordance with "best effort" practices, and may optionally provide a message sender with a receipt when the SMS message is successfully delivered to the recipient. However, SMS should be considered unreliable in any critical application, as there is never any guarantee of delivery of any particular SMS message.

Accordingly, what is desired is a method for ensuring reliable delivery of data using ubiquitous SMS transport services.

SUMMARY OF INVENTION

The invention includes a computer-implemented method for establishing a reliable, bidirectional communication pathway for arbitrary data between devices by wrapping a TCP message in an SMS message. The method includes the steps of forming the TCP message, encoding the TCP message in an SMS message encoding format, forming the SMS message, and sending the SMS message over an SMS messaging network. The SMS message includes a header denoting the SMS message as a TCP/SMS message and the encoded TCP message.

The invention further includes a computer program product comprising a computer usable medium having computer program logic recorded thereon for enabling a processor to wrap a TCP message in an SMS message. The computer program logic includes a first forming means for enabling a processor to form the TCP message, an encoding means for enabling a processor to encode the TCP message in an SMS message encoding format, a second forming means for enabling a processor to form the SMS message, and a sending means for enabling a processor to send the SMS message over an SMS messaging network. The SMS message includes a header denoting the SMS message as a TCP/SMS message and the encoded TCP message.

The invention additionally includes a system capable of wrapping a TCP message in an SMS message. The system includes a first module for forming the TCP message, a second module for encoding the TCP message in an SMS message encoding format, a third module for forming the SMS message, and a fourth module for sending the SMS message over an SMS messaging network. The SMS message includes a header denoting the SMS message as a TCP/SMS message and the encoded TCP message.

Further features and advantages of the present invention, as well as the structure and operation of various embodiments thereof, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the relevant art to make and use the invention.

Figure 1:
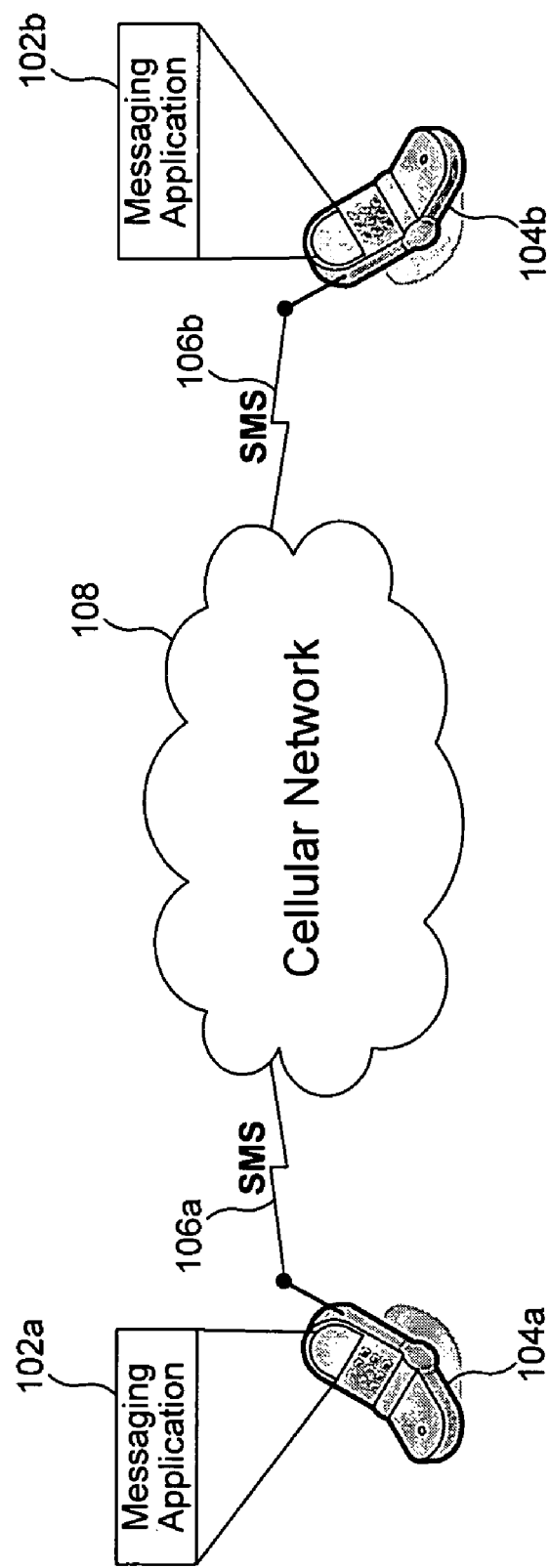
FIG. 1 depicts an SMS communication system, in accordance with an embodiment of the present invention.

The present invention will now be described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

1. Introduction

Communication specifications often incorporate the expected level of reliability into their design. For example, the Transport Control Protocol (TCP) defined in RFC 793 is designed as the basis for reliable, connection-oriented data movement over the Internet. TCP defines precisely how to obtain reliable delivery of data, where the data is received exactly once and in the same order in which it was sent, when utilizing an unreliable underlying transport, such as the Internet Protocol (IP). According to the invention, the ability of TCP to provide integrity for data communications can be extended to other applications.

The Short Message Service (SMS) transport provides a ubiquitous communication means, often usable by cellular phones, personal digital assistants (PDAs), and other mobile, hand-held, or portable devices. Additional devices, such as a personal computer (PC), may also be capable of establishing SMS communications, and such usage is not limited to mobile devices. The original intent of SMS was to enable users of the aforementioned devices to send short text messages to other SMS users.

As a typical SMS user establishes SMS communications using a mobile device connected to a wireless data service, there are many variables associated with that user's availability on the network. The SMS user's device may be turned off, may be outside of the user's wireless data service area of coverage, or may be susceptible to other conditions that can result in the non-delivery of an SMS message to the user. SMS, by design, does not guarantee the delivery of an SMS message to the intended recipient, but will instead perform a "best effort" attempt at delivery. If implemented by the particular SMS system being used, confirmation of a successful delivery may at best comprise an SMS message transmitted to the sender indicating that the delivery was made. For similar reasons, delivery of the confirmation message is also not guaranteed.

FIG. 1 illustrates an exemplary SMS communication system 100. Messaging applications 102a and 102b are run on mobile devices 104a and 104b, respectively. Messaging application 102a provides the framework for creating an SMS message on mobile device 104a for transmission over the SMS system 106a to a cellular network 108. The SMS message is received by mobile device 104b on the device's SMS system 106b, and presented to a user within messaging application 102b. One skilled in the relevant arts will appreciate that the intermediate network is not limited to a cellular network, and further that the mobile devices are only illustrative of possible communication devices. In an additional exemplary SMS communication system, messaging applications 102a and 102b may be executed on a PC or other computing device. In a typical usage of SMS communication system 100, a user of device 104a will enter a string of characters constituting a short text message into messaging application 102a and issue a command to send the message once it is completed. Messaging application 102a forms the text message into an SMS message, and it is transmitted by device 104a through SMS network 106a and cellular network 108 to the recipient's SMS network 106b for receipt and display by receiver device 104b and messaging application 102b.

2. TCP/SMS Network Topography

Although SMS messages are typically plain text messages manually entered by a user for the purpose of sending a brief note to another SMS user, it is possible to generate the contents of an SMS message using an appropriately configured computing device. While the format of the message content is determined by a particular SMS implementation, the message content itself need only be written in a manner that will presumably be understood by a recipient. The sender and recipient of an SMS message can therefore be specially configured devices capable of sending and receiving encoded messages understood by both devices.

Figure 2:
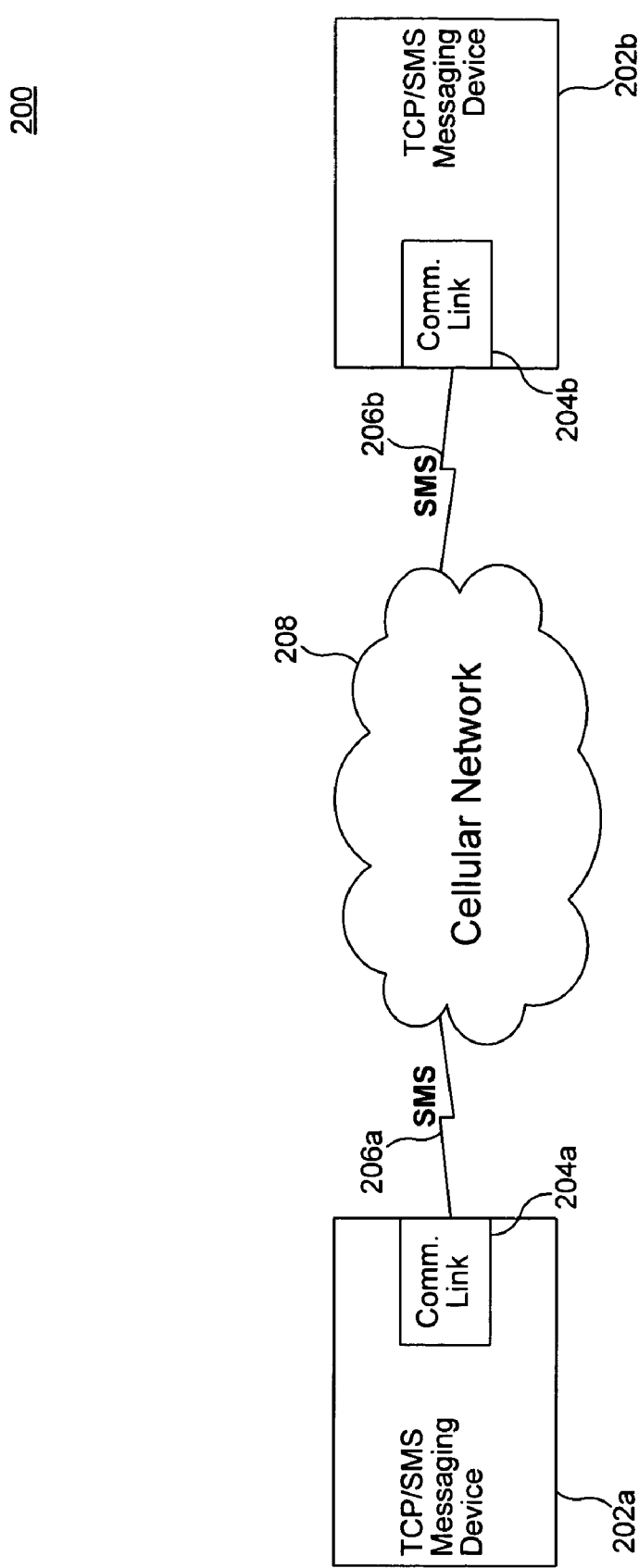
FIG. 2 depicts a communication network in accordance with an embodiment of the present invention.

FIG. 2 illustrates a network 200 capable of communicating using the TCP protocol over an SMS network (such functionality is sometimes herein referred to as "TCP over SMS", or "TCP/SMS"), in accordance with an embodiment of the present invention. A TCP/SMS messaging device 202a has access to a communication link 204a for the transmission of SMS messages 206a over an SMS network 208. TCP/SMS messaging device 202b is operable to receive SMS messages 206b over a similar communication link 204b. One skilled in the relevant arts will appreciate that SMS network 208 can be any network over which SMS messages are transmitted, including, but not limited to, the Internet or a cellular network. One skilled in the relevant arts will further appreciate that communications in network 200 are bidirectional, but in the description contained herein messaging device 202a will typically act as a message transmitter and messaging device 202b will typically act as a message receiver for purposes of illustration.

In accordance with an embodiment of the present invention, TCP/SMS messaging device 202a has data to transmit to TCP/SMS messaging device 202b. This data is prepared in a TCP message. The TCP specification assumes that TCP data is traveling within another wrapping protocol, usually the Internet Protocol (as with TCP/IP). In this embodiment, the TCP message is wrapped in an SMS message. The SMS protocol itself defines information necessary to properly route the TCP message, such as the length of the message, source address, and destination address. In accordance with a further embodiment of the present invention, when using SMS on a mobile phone network, the source address and destination address will each be a telephone number representing the transmitting and receiving devices.

3. Formation of a TCP/SMS Message

Figure 3:
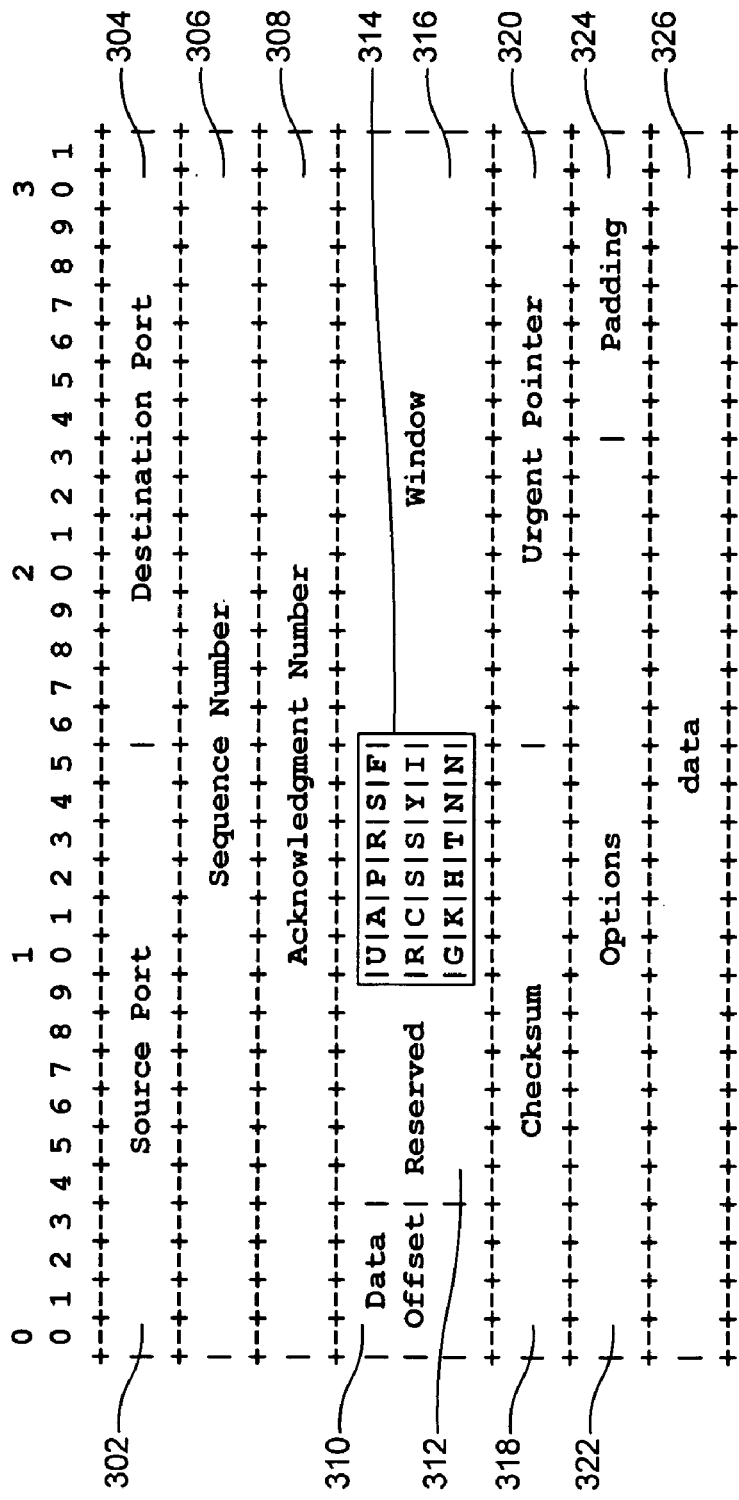
FIG. 3 illustrates the standard TCP header format, in accordance with an embodiment of the present invention.

FIG. 3 illustrates the format of a TCP message 300, in accordance with an embodiment of the present invention, as defined in RFC 793. TCP message 300 contains a source port 302 and destination port 304, each field being 2 bytes wide. A sequence number field 306, 4 bytes wide, specifies a sequence number for TCP message 300 for ensuring that TCP messages are received in the proper order and that no messages are missing. Acknowledgement number 308, also 4 bytes wide, is a number corresponding to a sequence number 306 which is transmitted by a receiver to indicate the next sequence number 306 it expects to receive. In accordance with an embodiment of the present invention, an initial sequence number 306 is determined by using the 4 lowest bytes of data from a system clock.

In accordance with an embodiment of the present invention, data offset 310, 4 bits, indicates a number of 32-bit records used by the TCP header. 6 bits of reserved area 312 are unused. A 6-bit status field 314 is used for control, with each bit corresponding to "Urgent", "Acknowledge", "Push", "Reset", "Sync", and "Finish" operations, in accordance with an embodiment of the present invention. Window field 316, 2 bytes wide, indicates how much data (in bytes) the sender is willing and able to receive from the receiver. The checksum field 318, 2 bytes wide, is a one's compliment of the one's compliment sum of all the rest of the 2 byte words in the message, including the TCP, header and data, but excluding the checksum word itself, in accordance with an embodiment of the present invention. Data field 326 comprises the payload of the TCP message.

It is possible to construct a compact version of the TCP header using only the fields necessary to support basic TCP messaging. In accordance with an embodiment of the present invention, the urgent pointer field 320, options field 322, and padding field 324 are unused. In accordance with a further embodiment of the present invention, data offset field 310, reserved bits 312, and window field 316 are also unused. However, it may be desirable to keep fields 310, 312, and 316 to ensure proper byte alignment of the TCP message fields. By eliminating unnecessary fields in the TCP header, and at the same time utilizing a constant TCP header size, more room is available for TCP data and data processing is simplified. One skilled in the relevant arts will appreciate, however, that an implementation of the entire TCP standard is possible using the techniques disclosed.

As a TCP/SMS message is not commonly expected SMS message data, and because SMS messages may be used for other purposes besides a TCP connection, it is necessary to have a header at the beginning of the TCP/SMS message that a receiver can look for in order to determine whether to interpret the remainder of the message as TCP data. In accordance with an embodiment of the present invention, the first 7 characters of a TCP/SMS message are "TCP/SMS". One skilled in the relevant arts will appreciate that any sequence of characters of any length may be used in a manner that distinguishes TCP/SMS messages from other expected SMS message data.

Figure 4:
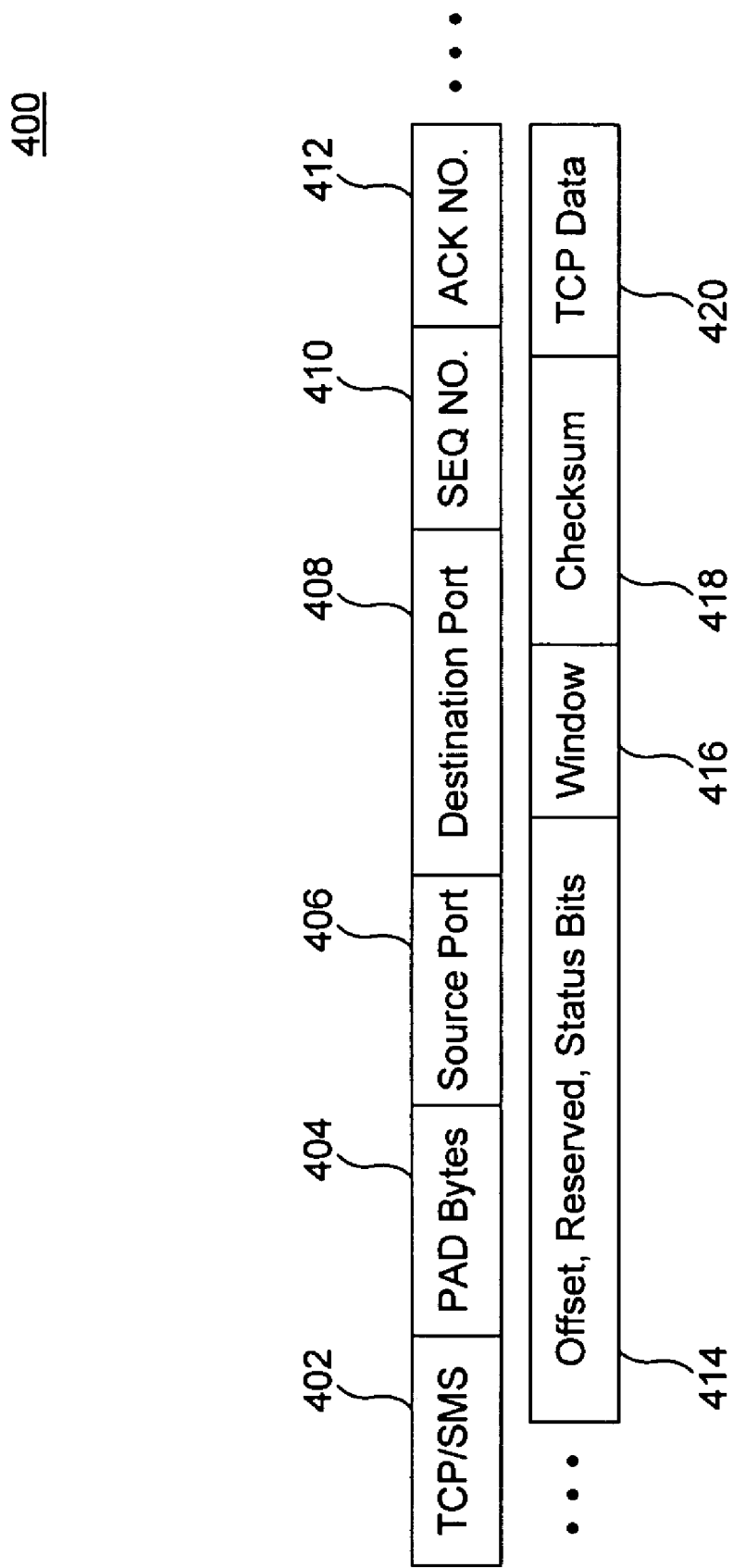
FIG. 4 illustrates a TCP/SMS message format, in accordance with an embodiment of the present invention.

FIG. 4 illustrates a TCP/SMS message 400 in accordance with an embodiment of the present invention. Field 402 contains the aforementioned "TCP/SMS" header characters, or an equivalent thereof. Field 404 contains a character denoting the number of pad bytes, which is discussed in Section 4, infra. Fields 406, 408, 410, 412, 414, 416, 418, and 420 comprise the corresponding data from TCP message 300 in FIG. 3, in accordance with an embodiment of the present invention. Both a sender and receiver of TCP/SMS messages are aware of an agreed upon standard for the TCP/SMS message, such as message 400, in order to determine how to form the message for sending and how to read the message for receipt.

4. Encoding the TCP Message

The SMS specification enables SMS messages to contain up to 160 7-bit characters, 140 8-bit characters, or 70 UCS2 characters. All SMS implementations handle 7-bit characters.

In accordance with an embodiment of the present invention, the TCP data shown as fields 406, 408, 410, 412, 414, 416, 418, and 420 in FIG. 4 (collectively, "the TCP data") is encoded into a 7-bit alphabet. One skilled in the relevant arts will appreciate that the TCP data may similarly be encoded into a UCS2 alphabet, or according to any other standard, and will further appreciate that the TCP data is natively encoded for an 8-bit alphabet.

The TCP data is encoded into the 7-bit alphabet through the use of base64 encoding, in accordance with an embodiment of the present invention. Base 64 encoding takes 3 bytes of data at a time and converts it to 4 printable ASCII characters within the 7-bit alphabet, wherein the selected printable ASCII characters are a set of 64 characters in the set [A-Z, a-z, 0-9, +, and /], in accordance with an embodiment of the present invention. One skilled in the relevant arts will appreciate that other available printable characters may be used instead of the indicated characters. One skilled in the relevant arts will further appreciate that other encoding methods may be utilized in order to map the 8-bit alphabet into the 7-bit alphabet.

Since base64 encoding requires 3 bytes of data input in order to produce the 4 printable ASCII character output, it is possible that the final iteration of base64 encoding performed on the TCP data only requires that one or two additional bytes be encoded. In accordance with an embodiment of the present invention, base64 encoding is performed on the remaining one or two bytes supplemented by one or two additional bytes of arbitrary data as required, a process known as "padding." The number of additional bytes needed for padding, in the range 0 to 2, are transmitted as a character ('0', '1', or '2') as part of SMS message 400 shown in FIG. 4, in field 404.

Figure 5:
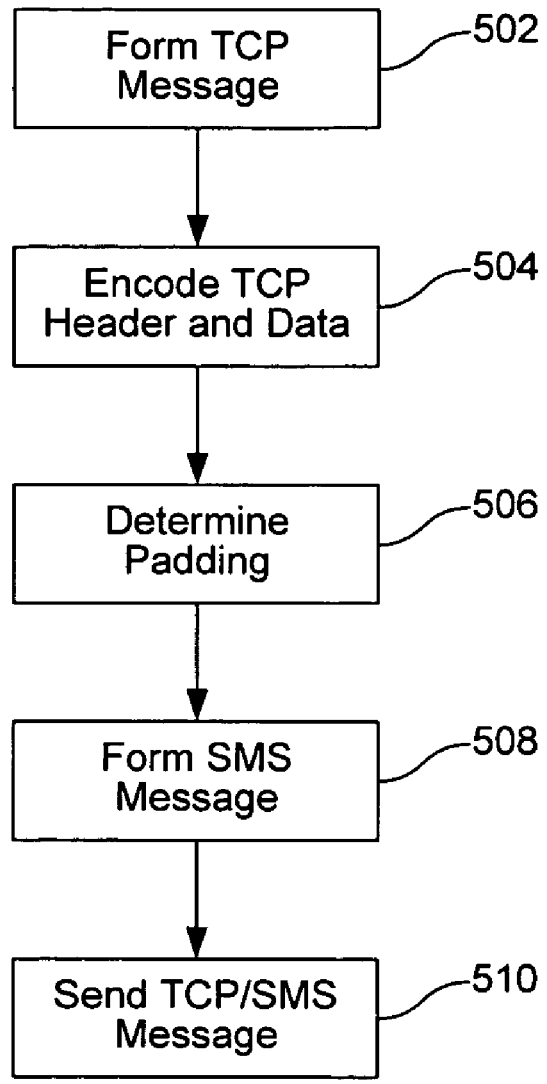
FIG. 5 is a flowchart illustrating the method by which a TCP/SMS message is created and transmitted, in accordance with an embodiment of the present invention.

FIG. 5 illustrates a flowchart 500 by which the process of preparing and transmitting a TCP/SMS message is described, in accordance with an embodiment of the present invention. In step 502, a TCP message, such as TCP message 300 in FIG. 3, is formed. As previously indicated, not all fields in TCP message 300 are necessary in the process of forming an acceptable TCP message, provided that a recipient of the TCP message is aware of the TCP header format being used. At step 504, the TCP message is encoded using base64 encoding as previously described in order for the TCP message to appear as printable ASCII characters within the SMS message. At step 506, any padding applied to complete base64 encoding of the TCP message is determined. At step 508, the SMS message 400 is formed as shown in FIG. 4, comprising 7 header characters "TCP/SMS", 1 character denoting the number of padding bytes (0-2), and up to 152 characters for the TCP message, in accordance with an embodiment of the present invention. At step 510, the formed TCP/SMS message is transmitted as a regular SMS message over a communication network 200 as shown in FIG. 2, in accordance with an embodiment of the present invention.

When utilizing 160 7-bit character SMS messages, with 8 characters occupied by the "TCP/SMS" header and the pad bytes field, 152 characters remain for the TCP header and data, in accordance with an embodiment of the present invention. With 152 characters, using base64 encoding, 114 bytes of binary data are available. Since the TCP header consumes 18 bytes, in accordance with an embodiment of the present invention, 96 bytes of TCP payload data are available for use in any TCP/SMS message.

When receiving a TCP/SMS message, a complimentary decoding algorithm is applied in order to retrieve the original binary TCP data from the SMS message. One skilled in the relevant arts will appreciate that as long as the sender and receiver of a TCP/SMS message agree to a common TCP/SMS message format, any number of possible implementations conforming to the aforementioned steps can be used to form and read a TCP/SMS message.

5. Exemplary Applications

TCP/SMS is useful in any circumstance where the flexibility and availability of SMS messaging and the reliability of TCP messaging is necessary. TCP/SMS provides reliable bi-directional communications that ensure all data is received through the use of a reply SMS message containing a TCP message acknowledging received TCP messages, and through the retransmission of any non-received messages.

In an exemplary application of communication network 200, messaging device 202a is an emergency messaging device for communicating with an emergency service, such as police or fire and rescue services, wherein the emergency service operates a complimentary messaging device 202b. By implementing TCP/SMS for transmission over communication link 204a as an SMS message 206a, through SMS network 208, for receipt by communication link 204b as an SMS message 206b, messaging device 202a is guaranteed delivery of the TCP/SMS message to messaging device 202b. If messaging device 202b does not receive the TCP/SMS message, device 202a will not receive an acknowledgement TCP/SMS message, in conformance with the TCP standard.

In a further exemplary application of communication network 200, SMS network 208 and messaging devices 202a and 202b implement port-addressed SMS. Messaging device 202b is operable to implement a number of TCP/SMS messaging services, each located on a different SMS port. In a port-addressed SMS system, a TCP/SMS message 206a sent by messaging device 202a over communication link 204a further includes a destination port associated with the desired destination service on messaging device 202b. In an additional exemplary application, the TCP/SMS message 206a further includes a source port for reply messages.

It is noted that these example applications are described herein solely for purposes of illustration, and not limitation.

6. Example Computer System Implementation

Figure 6:
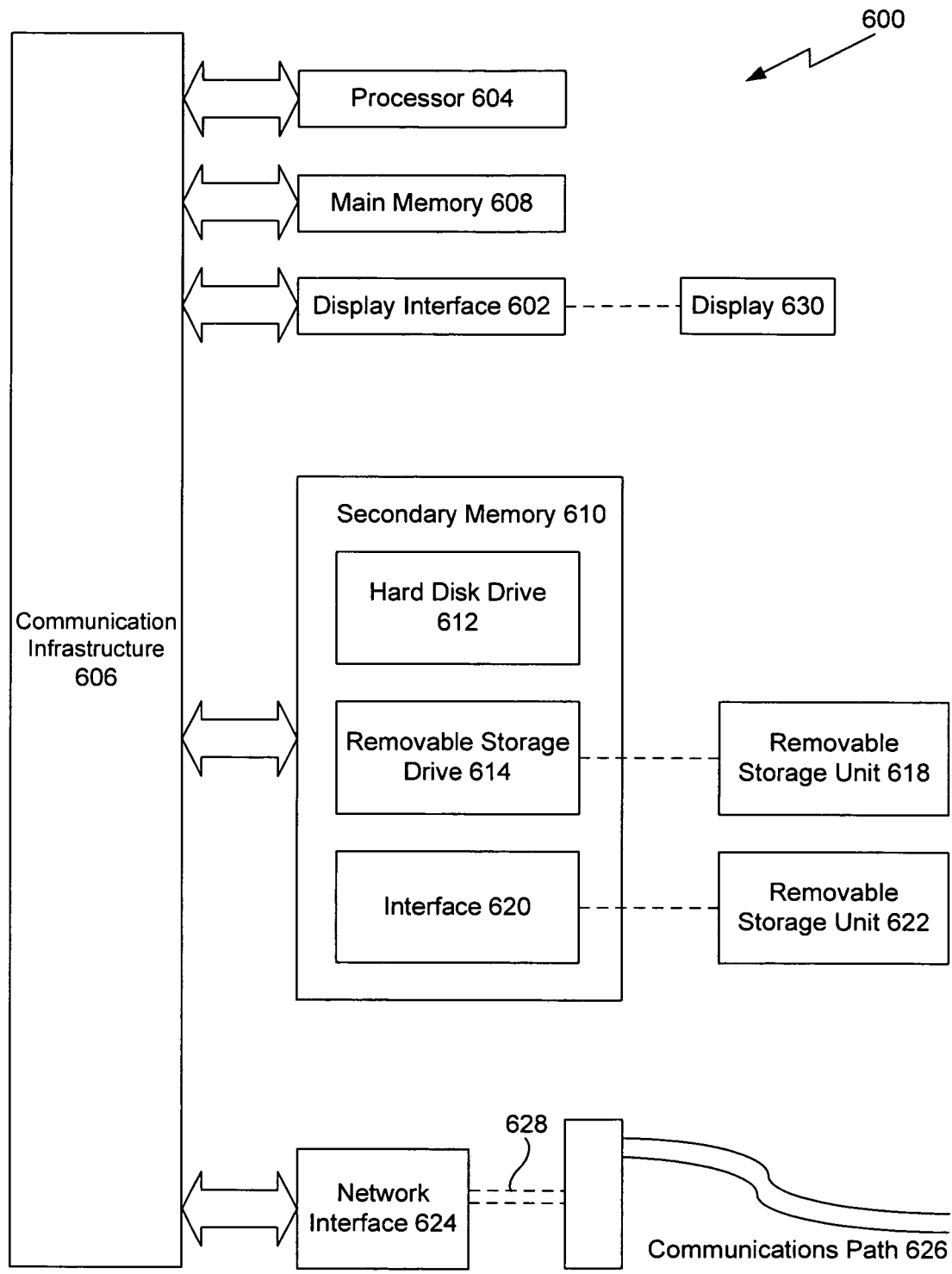
FIG. 6 depicts an example computer system in which the present invention (and/or components thereof) may be implemented.

Various aspects of the present invention can be implemented by software, firmware, hardware, or a combination thereof. FIG. 6 illustrates an example computer system 600 in which the present invention, or portions thereof, can be implemented as computer-readable code. For example, the method illustrated by flowchart 500 of FIG. 5 can be implemented in system 600. Various embodiments of the invention are described in terms of this example computer system 600. After reading this description, it will become apparent to a person skilled in the relevant art how to implement the invention using other computer systems and/or computer architectures.

Computer system 600 includes one or more processors, such as processor 604. Processor 604 can be a special purpose or a general purpose processor. Processor 604 is connected to a communication infrastructure 606 (for example, a bus or network).

Computer system 600 also includes a main memory 608, preferably random access memory (RAM), and may also include a secondary memory 610. Secondary memory 610 may include, for example, a hard disk drive 612, a removable storage drive 614, and/or a memory stick. Removable storage drive 614 may comprise a floppy disk drive, a magnetic tape drive, an optical disk drive, a flash memory, or the like. The removable storage drive 614 reads from and/or writes to a removable storage unit 618 in a well known manner. Removable storage unit 618 may comprise a floppy disk, magnetic tape, optical disk, etc. which is read by and written to by removable storage drive 614. As will be appreciated by persons skilled in the relevant art(s), removable storage unit 618 includes a computer usable storage medium having stored therein computer software and/or data.

In alternative implementations, secondary memory 610 may include other similar means for allowing computer programs or other instructions to be loaded into computer system 600. Such means may include, for example, a removable storage unit 622 and an interface 620. Examples of such means may include a program cartridge and cartridge interface (such as that found in video game devices), a removable memory chip (such as an EPROM, or PROM) and associated socket, and other removable storage units 622 and interfaces 620 which allow software and data to be transferred from the removable storage unit 622 to computer system 600.

Computer system 600 may also include a communications interface 624. Communications interface 624 allows software and data to be transferred between computer system 600 and external devices. Communications interface 624 may include a modem, a network interface (such as an Ethernet card), a communications port, a PCMCIA slot and card, or the like. Software and data transferred via communications interface 624 are in the form of signals which may be electronic, electromagnetic, optical, or other signals capable of being received by communications interface 624. These signals are provided to communications interface 624 via a communications path 626. Communications path 626 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 618, removable storage unit 622, and a hard disk installed in hard disk drive 612. "Computer program medium" and "computer usable medium" can also refer to memories, such as main memory 608 and secondary memory 610, which can be memory semiconductors (e.g. DRAMs, etc.). These computer program products, further including signals carried over communications path 626, are means for providing software to computer system 600.

Computer programs (also called computer control logic) are stored in main memory 608 and/or secondary memory 610. Computer programs may also be received via communications interface 624. Such computer programs, when executed, enable computer system 600 to implement the present invention as discussed herein. In particular, the computer programs, when executed, enable processor 604 to implement the processes of the present invention, such as the steps in the method illustrated by flowchart 500 of FIG. 5 discussed above. Accordingly, such computer programs represent controllers of the computer system 600. Where the invention is implemented using software, the software may be stored in a computer program product and loaded into computer system 600 using removable storage drive 614, interface 620, hard drive 612 or communications interface 624.

The invention is also directed to computer products comprising software stored on any computer useable medium. Such software, when executed in one or more data processing device, causes a data processing device(s) to operate as described herein. Embodiments of the invention employ any computer useable or readable medium, known now or in the future. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nano-technological storage device, etc.), and communication mediums (e.g., wired and wireless communications networks, local area networks, wide area networks, intranets, etc.).

7. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method comprising:
   encoding a TCP message directly in an SMS message encoding format;
   forming an SMS message comprising a header denoting the SMS message as a TCP/SMS message and the encoded TCP message; and
   sending the SMS message over an SMS messaging network.

2. The method of claim 1, wherein encoding the TCP message comprises:
   determining padding resulting from the encoding.

3. The method of claim 2, wherein encoding the TCP message directly in an SMS message encoding format comprises specifying a value indicating the padding in the SMS message.

4. The method of claim 1, further comprising:
   receiving a second SMS message over the SMS messaging network;
   reading a header of the second SMS message to identify the second SMS message as a TCP/SMS message;
   decoding the second TCP message in the second SMS message; and
   reading data contained in the second TCP message.

5. The method of claim 1, wherein encoding the TCP message comprises:
   encoding the TCP message using base64 encoding.

6. The method of claim 1, further comprising:
   determining a sequence number of the TCP message.

7. The method of claim 6, wherein determining the sequence number of the TCP message comprises generating the sequence number using a system clock.

8. The method of claim 4, further comprising:
   processing the data contained in the second TCP message in a service associated with an SMS destination port specified in the second SMS message.

9. A non-transitory computer usable medium having instructions recorded thereon that, if executed by a computing device, cause the computing device to perform a method comprising:
   encoding a TCP message directly in an SMS message encoding format;
   forming an SMS message comprising a header denoting the SMS message as a TCP/SMS message and the encoded TCP message; and
   sending the SMS message over an SMS messaging network.

10. The computer usable medium of claim 9, wherein encoding the TCP message comprises:
    determining padding resulting from the encoding.

11. The computer usable medium of claim 10, wherein encoding the TCP message directly in an SMS message encoding format comprises specifying a value indicating the padding in the SMS message.

12. The computer usable medium of claim 9, the method further comprising:
    receiving a second SMS message over the SMS messaging network;
    reading a header of the second SMS message to identify the second SMS message as a TCP/SMS message;
    decoding the second TCP message in the second SMS message; and
    reading data contained in the second TCP message.

13. The computer usable medium of claim 9, wherein encoding the TCP message comprises:
    encoding the TCP message using base64 encoding.

14. The computer usable medium of claim 9, the method further comprising:
    determining a sequence number of the TCP message.

15. The computer usable medium of claim 14, wherein determining the sequence number of the TCP message comprises generating the sequence number using a system clock.

16. The computer usable medium of claim 12, the method further comprising:
    processing the data contained in the second TCP message in a service associated with an SMS destination port specified in the second SMS message.

17. A system comprising:
    a memory configured to store:
       an encoding module configured to encode a TCP message directly in an SMS message encoding format,
       a forming module configured to form an SMS message comprising a header denoting the SMS message as a TCP/SMS message and the encoded TCP message, and
       a sending module configured to send the SMS message over an SMS messaging network; and
    one or more processors configured to process the modules.

18. The system of claim 17, wherein the encoding module is further configured to determine padding resulting from the encoding.

19. The system of claim 18, wherein the encoding module is further configured to specify a value indicating the padding in the SMS message.

20. The system of claim 17, further comprising:
    a receiving module configured to receive a second SMS message over the SMS messaging network;
    a first reading module configured to read a header of the second SMS message to identify the second SMS message as a TCP/SMS message;
    a decoding module configured to decode the second TCP message in the second SMS message; and
    a second reading module configured to read data contained in the second TCP message.

21. The system of claim 17, wherein the encoding module is further configured to encode the TCP message using base64 encoding.

22. The system of claim 17, further comprising:
    a determining module configured to determine a sequence number of the TCP message.

23. The system of claim 22, wherein the determining module is further configured to generate the sequence number using a system clock.

24. The system of claim 20, further comprising:
    a processing module configured to process the data contained in the second TCP message in a service associated with an SMS destination port specified in the second SMS message.

* * * * *